United States Patent
Tao et al.

(10) Patent No.: US 12,044,641 B2
(45) Date of Patent: Jul. 23, 2024

(54) EMISSION MONITORING OF FLARE SYSTEMS

(71) Applicant: Baker Hughes Oilfield Operations LLC, Houston, TX (US)

(72) Inventors: Chong Tao, Billerica, MA (US); Aniruddha Weling, Wayland, MA (US); Lei Sui, Winchester, MA (US); Anthony Kowal, Berlin, MA (US); Michael Muller, Belmont, MA (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 612 days.

(21) Appl. No.: 17/325,876

(22) Filed: May 20, 2021

(65) Prior Publication Data

US 2021/0372864 A1 Dec. 2, 2021

Related U.S. Application Data

(60) Provisional application No. 63/032,169, filed on May 29, 2020.

(51) Int. Cl.
  *G06F 11/30* (2006.01)
  *F01N 11/00* (2006.01)
  (Continued)

(52) U.S. Cl.
  CPC ............. *G01N 25/22* (2013.01); *F01N 11/00* (2013.01); *F23G 5/50* (2013.01); *F23N 1/002* (2013.01);
  (Continued)

(58) Field of Classification Search
  CPC ...................................................... G01N 25/22
  See application file for complete search history.

(56) References Cited

U.S. PATENT DOCUMENTS 4,634,369 A * 1/1987 McGill ................... F23G 7/085
                                                             431/29
6,216,091 B1 4/2001 Hammond
(Continued)

FOREIGN PATENT DOCUMENTS

JP        5256146 B2    8/2013
WO    2018-005523 A1    1/2018

OTHER PUBLICATIONS

International Search Report and Written Opinion corresponding to PCT/US2021/034001, dated Sep. 16, 2021.

*Primary Examiner* — Phuong Huynh
(74) *Attorney, Agent, or Firm* — Mintz, Levin, Cohn, Ferris, Glovsky and Popeo, P.C.

(57) ABSTRACT

Systems and methods for monitoring emissions of a combusted gas are provided. The method includes determining a first net heating value of a flare gas. The method also includes determining a second net heating value of a combustion gas including the flare gas. The second net heating value can be determined based upon the first net heating value and a volumetric flow rate of the flare gas. Based upon the value of the second net heating value, an empirical model or a non-parametric machine learning model can be selected. A combustion efficiency of the combustion gas can be determined using the selected model, the second net heating value, and selected ones of the process conditions and the environmental conditions. Total emissions of the combustion mixture can be further determined from the combustion efficiency and a volumetric flow rate of the combustion gas.

28 Claims, 5 Drawing Sheets

(51) Int. Cl.
*F23G 5/50* (2006.01)
*F23N 1/00* (2006.01)
*F23N 1/08* (2006.01)
*F23N 5/18* (2006.01)
*G01J 5/00* (2022.01)
*G01N 25/20* (2006.01)
*G01N 25/22* (2006.01)
*G01N 25/28* (2006.01)
*G05B 13/02* (2006.01)
*G05B 13/04* (2006.01)
*F23G 7/08* (2006.01)
*G01N 21/84* (2006.01)

(52) U.S. Cl.
CPC ............... *F23N 1/082* (2013.01); *F23N 5/18* (2013.01); *G01J 5/0018* (2013.01); *G01N 25/20* (2013.01); *G01N 25/28* (2013.01); *G05B 13/0265* (2013.01); *G05B 13/042* (2013.01); *F23G 7/08* (2013.01); *F23N 2223/08* (2020.01); *F23N 2223/48* (2020.01); *F23N 2235/12* (2020.01); *F23N 2241/12* (2020.01); *G01N 2021/8411* (2013.01); *G01N 2021/8416* (2013.01)

(56) References Cited

U.S. PATENT DOCUMENTS

2018/0209853 A1\* 7/2018 Kraus ................... G01N 21/72
2019/0242575 A1\* 8/2019 Fisher ..................... F23L 7/005

\* cited by examiner

EMISSION MONITORING OF FLARE SYSTEMS

CROSS-REFERENCE TO RELATED APPLICATIONS

This application claims the benefit of U.S. Provisional Patent Application No. 63/032,169 filed on May 29, 2020, and entitled "Emission Monitoring Of Flare Systems," the entirety of which is incorporated by reference herein.

BACKGROUND

Flaring is a process of combusting gases in an industrial process. In some cases, flaring can be employed to dispose of unwanted process gases (e.g., excess hydrocarbon gases resulting from crude oil extraction). In other cases, flaring can be performed for safety and/or maintenance. In either case, flaring results in emission of pollutants, such as volatile organic compounds (VOCs) and/or greenhouse gases such as methane ($CH_4$). In order to comply with regulatory requirements and/or optimize flare operation, it is common to monitor flare emissions.

SUMMARY

A variety of techniques have been developed for monitoring emissions of flare systems. In one aspect, static flare emission modeling employs a design model of a combustion source such as a flare, to determine how much pollutant gas is released from flaring. The AP-42 method is an example, where an emission factor (EF) is determined as a representative value that relates a quantity of pollutant released in the atmosphere based on the flow of gas being combusted. While static flare design models are commonly employed, they rely solely upon static inputs and do not account for changes in environmental conditions, such as crosswind speed, or changes in process conditions, such as flare gas composition, flare gas pressure, or flare gas temperature. These changes can introduce significant and undesirable error into the output of static flare design models.

In another aspect, multi-spectral imaging can be employed for flare emission monitoring. In general, the vented gas and/or its combustion products absorb light at a unique combination of frequencies (a unique spectrum) that can be detected. Multi-spectral imaging is a technique that acquires pictures of the open flame across many narrow spectral bands within the electromagnetic spectrum (e.g., visible, near-infrared, mid-infrared, etc.) Each pixel within an image can be analyzed using radiometric models to measure absorption spectra of components combusted within the flare and identify these components. However, while multi-spectral imaging can provide a direct measure of emissions, multi-spectral cameras can be relatively complex, expensive and are not commonly employed.

In general, systems and methods are provided for online monitoring of combustion efficiency of a flare gas combusted in a flare stack.

In an embodiment, a method of monitoring emissions is provided and can include determining, by one or more processors, a first net heating value (NHV) of a flare gas emitted from an industrial process. The method can also include determining, by the one or more processors, a second net heating value ($NHV_{CZ}$) of a combustion gas within a combustion zone including at least the flare gas. The second net heating value ($NHV_{CZ}$) can be determined based upon the first net heating value (NHV) and a volumetric flow rate of the flare gas. The method can further include comparing, by the one or more processors, the second net heating value ($NHV_{CZ}$) to a predetermined criterion. The method can additionally include selecting an empirical model configured to generate a first estimate of combustion efficiency of the combustion gas when the second net heating value ($NHV_{CZ}$) is determined to satisfy the predetermined criterion. The method can further include selecting a non-parametric machine learning model configured to generate a second estimate of combustion efficiency of the combustion mixture when the second net heating value ($NHV_{CZ}$) does not satisfy the predetermined criterion. The method can additionally include outputting, by the one or more processors, the first or second combustion efficiency estimate corresponding to the selected model.

In another embodiment, the method can also include determining, by the one or more processors, total emissions of the combustion gas based upon the output one of the first combustion efficiency estimate or the second combustion efficiency estimate.

In another embodiment, determining the first net heating value (NHV) can include receiving the first net heating value from a data storage device.

In another embodiment, determining the first net heating value (NHV) can include measuring, prior to combustion, a speed of sound in the flare gas, a pressure of the flare gas, and a temperature of the flare gas and determining, by the one or more processors, a molecular weight of the flare gas based upon the measured speed of sound in the flare gas, the pressure of the flare gas, and the temperature of the flare gas.

In another embodiment, the speed of sound in the flare gas can be measured by an ultrasonic flow meter.

In another embodiment, the method can also include measuring, by a multi-spectral imaging system, absorption/emission spectra of the combustion gas and determining, by the one or more processors, a third estimate of the combustion efficiency of the combustion gas based upon the measured spectra.

In another embodiment, the method can also include adjusting the selected model such that the output combustion efficiency estimate is approximately equal to the third estimate of combustion efficiency.

In another embodiment, the combustion gas can also include a supplementary fuel gas and the second net heating value ($NHV_{CZ}$) can be further determined based upon a volumetric flow rate of the supplementary fuel gas.

In another embodiment, the combustion gas can also include at least one assist gas and the second net heating value ($NHV_{CZ}$) can be further determined based upon a volumetric flow rate of the assist gas.

In another embodiment, the combustion gas can also include a supplementary fuel gas and at least one assist gas and the second net heating value ($NHV_{CZ}$) can be further determined based upon a volumetric flow rate of the supplementary fuel gas and a volumetric flow rate of the at least one assist gas.

In another embodiment, the conduit can be a portion of a flare stack.

In an embodiment, a system for monitoring emissions is provided. The system can include one or more processors. The one or more processors can be configured to determine a first net heating value (NHV) of a flare gas emitted from an industrial process. The one or more processors can also be configured to determine a second net heating value ($NHV_{CZ}$) of a combustion gas within a combustion zone including the flare gas. The second net heating value ($NHV_{CZ}$) can be determined based upon the first net heating value (NHV) and a volumetric flow rate of the flare gas. The one or more processors can be further configured to compare the second net heating value ($NHV_{CZ}$) to a predetermined criterion. The one or more processors can additionally be configured to select an empirical model configured to generate a first estimate of combustion efficiency of the combustion gas when the second net heating value ($NHV_{CZ}$) satisfies the predetermined criterion. The one or more processors can also be configured to select a non-parametric machine learning model configured to generate a second estimate of combustion efficiency of the combustion gas when the second net heating value ($NHV_{CZ}$) does not satisfy the predetermined criterion. The one or more processors can additionally be configured to output the selected one of the first combustion efficiency estimate or second combustion efficiency estimate corresponding to the selected model.

In another embodiment, the one or more processors are further configured to determine total emissions of the combustion gas (e.g., uncombusted or partially combusted combustion gas) based upon the output one of the first combustion efficiency estimate or the second combustion efficiency estimate.

In another embodiment, the system can also include a data storage device in communication with the one or more processors. The one or more processors can be further configured to determine the first net heating value (NHV) by receipt of the first net heating value from the data storage device.

In another embodiment, the one or more processors can also be configured to receive a speed of sound in the flare gas prior to combustion, a pressure of the flare gas prior to combustion, and a temperature of the flare gas prior to combustion, and to determine a molecular weight of the flare gas based upon the measured speed of sound in the flare gas, the pressure of the flare gas, and the temperature of the flare gas.

In another embodiment, the system can also include a flow meter configured to measure the speed of sound in the flare gas and the flow rate of the flare gas prior to combustion, a temperature sensor configured to measure the temperature of the flare gas, and a pressure sensor configured to measure the pressure of the flare gas.

In another embodiment, the flow meter can be an ultrasonic flow meter.

In another embodiment, the system can further include a multi-spectral imaging system configured to measure absorption/emission spectra of the combustion gas. The one or more processors can be further configured to determine a third estimate of the combustion efficiency of the combustion gas based upon the measured spectra.

In another embodiment, the one or more processors can be further configured to adjust the selected model such that the output combustion efficiency estimate is approximately equal to the third estimate of combustion efficiency.

In another embodiment, the combustion gas can further include a supplementary fuel gas and the one or more processors can be configured to determine the second net heating value ($NHV_{CZ}$) based upon a volumetric flow rate of the supplementary fuel gas.

In another embodiment, the combustion gas can further include at least one assist gas and the one or more processors can be configured to determine the second net heating value ($NHV_{CZ}$) based upon a volumetric flow rate of the assist gas.

In another embodiment, the combustion gas can further include a supplementary fuel gas and at least one assist gas and the one or more processors can be configured to determine the second net heating value ($NHV_{CZ}$) based upon a volumetric flow rate of the supplementary fuel gas and a volumetric flow rate of the assist gas.

In another embodiment, the conduit can be a portion of a flare stack.

In an embodiment, a method for flare control is provided. The method can include receiving, by one or more processors, a combustion efficiency (CE) estimate determined for a combustion gas flared within a combustion zone in a flaring operation. The combustion gas can include at least a flare gas emitted from an industrial process. The method can also include determining, by the one or more processors, a first set point for flow of the flare gas based upon the received CE estimate. The method can further include determining, by the one or more processors, a first volumetric flow rate of the flare gas. The method can additionally include determining, by the one or more processors, a first deviation between the first volumetric flow rate and the first set point. The method can also include outputting, by the one or more processors, one or more first command signals when the determined first deviation is greater than a predetermined first tolerance. One or more first command signals can be operative to, upon receipt by a flow regulator, cause the flow regulator to actuate in a manner that reduces the determined first deviation.

In another embodiment, the received CE estimate can be determined by an empirical model.

In another embodiment, the received CE estimate can be determined by a non-parametric machine learning model.

In another embodiment, the combustion gas can further include at least one supplementary fuel gas. The one or more processors can be further configured to determine a second set point for flow of the at least one supplementary fuel gas, or a vent gas including the flare gas and the at least one supplementary fuel gas, based upon the received CE estimate. The one or more processors can also be configured to determine a second volumetric flow rate of the at least one supplementary fuel gas or the vent gas. The one or more processors can be additionally configured to determine a second deviation between the second volumetric flow rate and the second set point. The one or more processors can also be configured to output one or more second command signals when the determined second deviation is greater than a second predetermined tolerance. The one or more second command signals can be operative to, upon receipt by a corresponding flow regulator, cause the flow regulator to actuate in a manner that reduces the determined second deviation.

In another embodiment, the combustion gas can further include at least one assist gas. The one or more processors can be further configured to determine a third set point for flow of the at least one assist gas based upon the received CE estimate. The one or more processors can be further configured to determine a third volumetric flow rate of the at least one at least one assist gas. The one or more processors can additionally be configured to determine a third deviation between the third volumetric flow rate and the third set point. The one or more processors can also be configured to output one or more third command signals when the determined third deviation is greater than a third predetermined tolerance. The one or more third command signals can be operative to, upon receipt by a corresponding flow regulator, cause the flow regulator to actuate in a manner that reduces the determined third deviation.

DESCRIPTION OF DRAWINGS

These and other features will be more readily understood from the following detailed description taken in conjunction with the accompanying drawings, in which.

It is noted that the drawings are not necessarily to scale. The drawings are intended to depict only typical aspects of the subject matter disclosed herein, and therefore should not be considered as limiting the scope of the disclosure.

DETAILED DESCRIPTION

Combustible gases, referred to as flare gases, are often burned in industrial operations for disposal and/or safety. Emissions from this combustion are commonly monitored for regulatory compliance, amongst other reasons. Emissions monitoring can estimate the amount of different emissions from a combustion source using models. However, these models can employ static inputs (e.g., stationary process conditions and/or environmental conditions). When these inputs change, the models can output erroneous estimates of emissions. Accordingly, improved systems and methods for monitoring emissions (e.g., combustion efficiency) of a combusted flare gas or flare gas mixture are provided. Live (e.g., real-time) measurements of process conditions and environmental conditions can be used as inputs to a selected model for determining estimates of combustion efficiency. The model that is selected can be the one expected to provide a high accuracy estimate of combustion efficiency given the input process conditions and environmental conditions. In this manner, estimates of combustion efficiency can be provided with greater accuracy over a wider range of flare conditions and/or optimal use of online sensors and computational resources as compared to estimates of combustion efficiency obtained from a single static model.

Embodiments of sensing systems and corresponding methods for monitoring emissions of a hydrocarbon gas are discussed with specific reference to combustion of a flare gas. However, embodiments of the disclosure can be employed to monitor emissions of any gas or gas mixture during combustion without limit.

Figure 1:
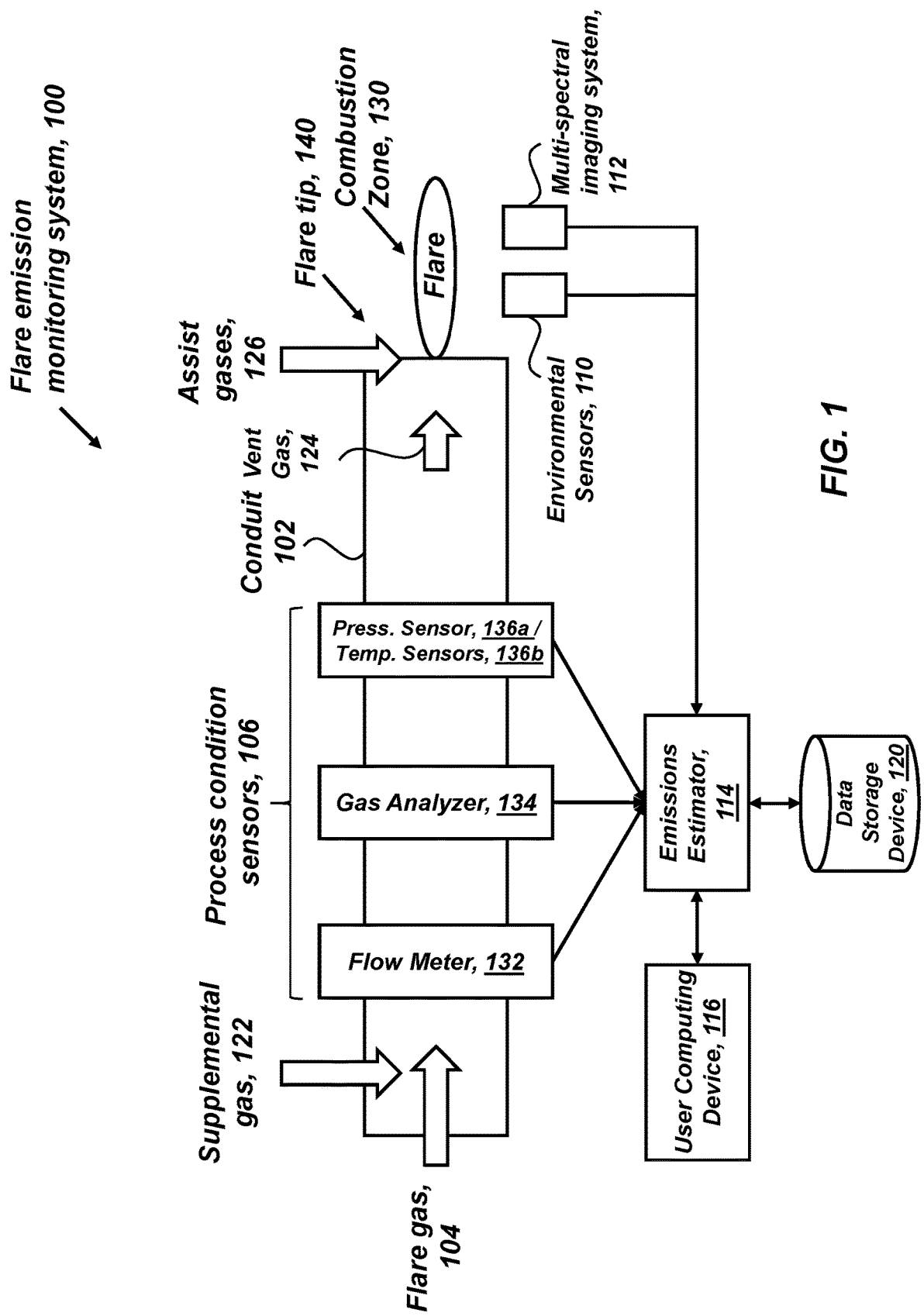
FIG. 1 is a schematic diagram illustrating one exemplary embodiment of a system for monitoring emissions including an emissions estimator.

FIG. 1 illustrates one exemplary embodiment of a flare emission monitoring system 100 for monitoring emissions of a flaring process. As shown, the flare emission monitoring system 100 can be in fluid communication with a conduit 102 (e.g., a flare stack) that receives a flow of a flare gas 104 emitted by an industrial process, and the flare emission monitoring system 100 includes a plurality of process condition sensors 106, one or more environmental sensors 110, a multi-spectral imaging system 112, an emissions estimator 114, a user computing device 116, and a data storage device 120.

It can be appreciated that a flaring process can combust the flare gas 104 alone or a mixture of gases including the flare gas 104. Notably, under some circumstances, one or more gases can be mixed with the flare gas 104 to modify the energy content of the resultant gas mixture to facilitate combustion. In one example, a supplemental gas 122 (e.g., a fuel gas) can be added to the flare gas 104 within the conduit 102 to increase energy content of the resultant gas mixture, referred to herein as a vent gas 124. In another example, at least one assist gas(es) 126 (e.g., air and/or steam) can be added to the flare gas 104 or to the vent gas 124 (e.g., at a terminal end of the conduit 102, prior to a combustion zone 130) to improve combustion by decreasing energy content of the resultant gas mixture.

The plurality of process condition sensors 106 can be configured to measure respective process conditions of the gas(es) employed in the flaring process. Accordingly, the process condition sensors 106 can be independently positioned on, adjacent to, or within the conduit 102. The process condition sensors 106 can include, but are not limited to, one or more flow meters 132, gas analyzers 134, and one or more pressure sensors 136a and/or temperature sensors 136b. The flow meter(s) 132 can be configured to measure a speed of sound in the flare gas 104 and flow rates of the flare gas 104, the supplemental gas 122, the vent gas 124, and/or the assist gas(es) 126 prior to combustion. As an example, the flow meter 132 can be an ultrasonic flow meter. The gas analyzer(s) 134 can be configured to measure a ratio of carbon to hydrogen in the flare gas 104 or the gas mixture (e.g., the flare gas 104 with the supplemental gas 122 and/or assist gas(es) 126) prior to combustion. The pressure sensor(s) 136a can be configured to measure the pressure of the flare gas 104 prior to combustion. The temperature sensor(s) 136b can be configured to measure the temperature of the flare gas 104 prior to combustion.

The one or more environmental sensors 110 can be configured to measure one or more environmental conditions outside of the conduit 102 and adjacent to a flare tip 140. The flare tip 140 can be a terminal end of the conduit 102 prior to the combustion zone 130 where the flare gas 104 is combusted. The flare gas 104 or gas mixture including the flare gas 104 that enters the combustion zone 130 is referred to herein as a combustion gas. As an example, the one or more environmental sensors 110 can include a weather station configured to measure a speed of a crosswind adjacent to the flare tip 140.

The gas analyzer 134 can be configured to measure a ratio of carbon to hydrogen of the vent gas 124 (or the flare gas 104 if the supplemental gas 122 is not added) prior to combustion. As an example, the gas analyzer 134 can be a gas chromatograph or a mass spectrometer.

With further reference to FIG. 1, each of the process condition sensors 106 and the environmental sensors 110 is in communication with the emissions estimator 114. The emissions estimator 114 can be any computing device capable of performing the functions of flare emission monitoring discussed herein, including determination of combustion efficiency and total emissions of the flaring process. The user computing device 116 and the data storage device 120 are further provided in communication with the emissions estimator 114. The user computing device 116 can include a display configured to receive and display estimates of combustion efficiency and/or total emissions output by the emissions estimator 114. The data storage device 120 can be employed for storage and/or retrieval of process and/or environmental data as well as storage of combustion efficiency estimates and/or total emissions output by the emissions estimator 114.

In use, the process condition sensors 106 can acquire measurements of at least a portion of respective process conditions of the gases involved in the flaring process prior to combustion, while the environmental sensor(s) 110 can acquire measurements of respective environmental conditions adjacent to the flare tip 140. In other embodiments, one or more of the process conditions can be constant values stored by a data storage device or input by an operator. As discussed in greater detail below, the process conditions and environmental conditions can be received by the emissions estimator 114 and used to determine respective estimates of combustion efficiency of the flaring process according to different models, such as empirical models and non-parametric machine learning models.

In general, combustion efficiency (CE) can be calculated from predetermined factors including the process conditions and environmental conditions using an empirical parametric model derived from historical experimental tests. Such models are relatively easy to train with limited amount of experimental data and fast to implement. However, their prediction accuracy and applicability can be limited to relatively stable operating conditions where the process parameters and/or environmental parameters are not fluctuating rapidly, such as during non-flaring nominal flow conditions.

Alternatively, combustion efficiency can also be derived from a computationally intensive, non-parametric machine learning (e.g., an artificial intelligence (AI)) model that has also been trained with relevant historical experimental data. The non-parametric model can employ all available process parameter and environmental condition data, while making no assumptions on the functional form of the relationship between input and output variables. While the non-parametric model can require more data to be trained and more computational resources to be implemented as compared to the empirical model, it can provide higher predictive accuracy.

Accordingly, the emissions estimator 114 can be further configured to select between the empirical and non-parametric machine learning models and output combustion efficiency estimates according to the selected model. In an embodiment, the emissions estimator 114 can output a combustion efficiency estimate according to the empirical model when a change in the net heating value of the flare gas 104 within the combustion zone 130 ($NHV_{CZ}$) over a defined time interval is less than a predetermined maximum amount (e.g., either on the basis of an absolute change (magnitude) or a percentage change). Alternatively, the emissions estimator 114 can output a combustion efficiency estimate according to the machine learning model when the change in net heating value of the combustion gas within the combustion zone ($NHV_{CZ}$) over a defined time interval is greater than the predetermined maximum amount. Selecting the model in this manner reflects the understanding that the net heating value of the combustion gas within the combustion zone ($NHV_{CZ}$) can vary with the process conditions and/or environmental conditions and that the accuracy of combustion efficiency estimates provided by the empirical model can be reduced when the process conditions and/or environmental conditions, and consequent calculations of the net heating value of the combustion gas within the combustion zone ($NHV_{CZ}$) vary too much. Thus, this approach allows the flare emission monitoring system 100 to output a combustion efficiency estimate according to the model expected to provide the highest accuracy in view of the current process conditions and environmental conditions.

In alternative embodiments, the flare emissions monitoring system 100 can optionally include a multi-spectral imaging system 112 in communication with the emissions estimator 114. The multi-spectral imaging system 112 can be configured to measure absorption/emission spectra of the combustion zone 130 and determine a further estimate of combustion efficiency from the measured spectra. Such combustion efficiency estimates are independent of the process conditions and environmental conditions. As such, the emissions estimator 114 can receive estimates of combustion efficiency from the multi-spectral imaging system 112 for use in adjusting the selected model to output approximately the same combustion efficiency as this independent estimate. This approach can improve the accuracy of modeling and attendant combustion efficiency estimates.

Figure 2:
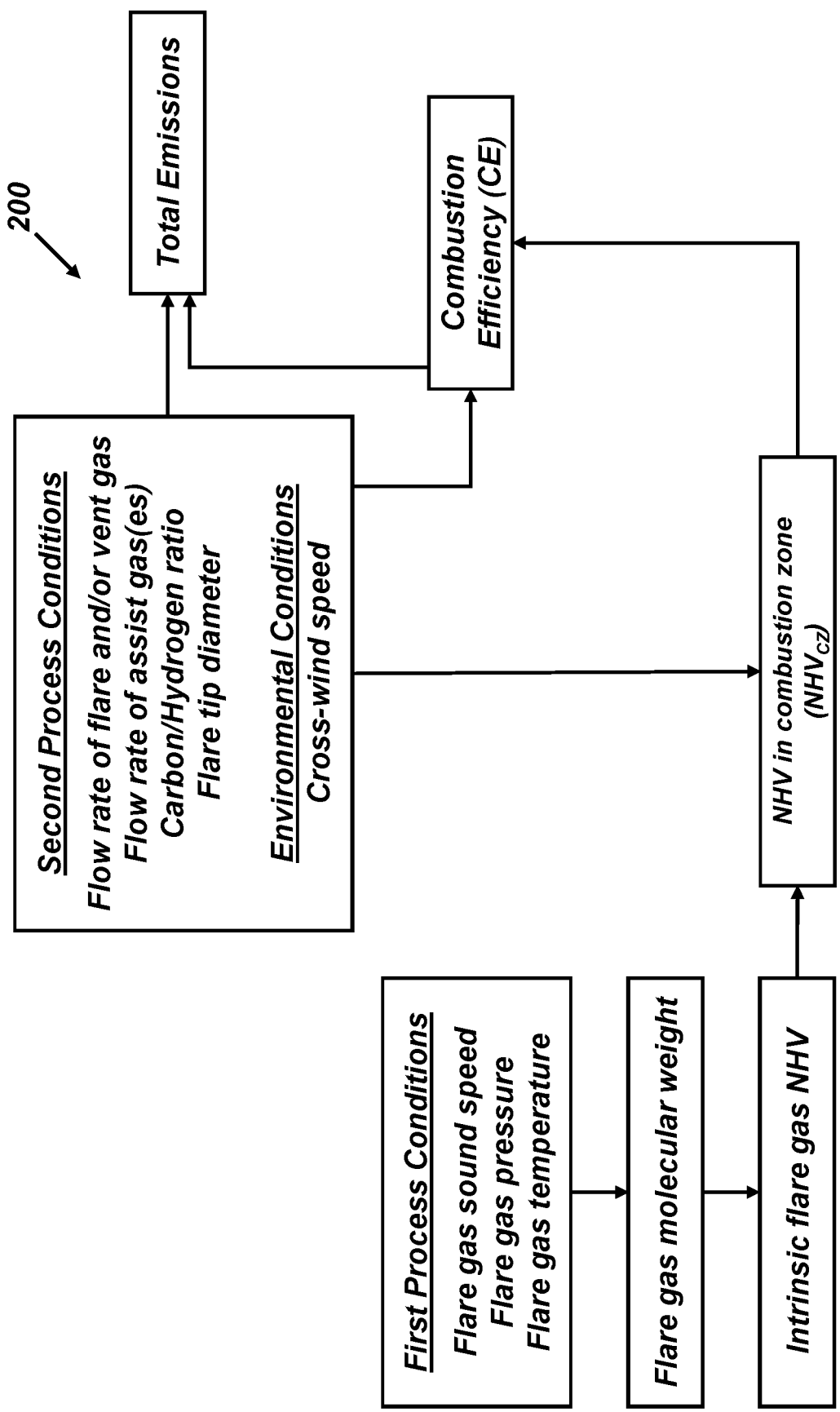
FIG. 2 is a block diagram illustrating calculations performed by the emissions estimator using process conditions and environmental conditions to determine combustion efficiency and total emissions of a flaring process.

FIG. 2 is a block diagram 200 illustrating embodiments of various inputs received by the emissions estimator 114 and calculations performed by the emissions estimator 114 to determine estimates of combustion efficiency and total emissions. As discussed in greater detail below, the emissions estimator 114 can be configured to determine a first net heating value (NHV) for the flare gas 104 based upon a first set of process conditions. This first net heating value (NHV) is an intrinsic net heating value that is a property of the flare gas 104. Using this first net heating value (NHV), as well as a second set of process conditions, a second net heating value of the combustion gas within the combustion zone ($NHV_{CZ}$) can be determined. This second net heating value ($NHV_{CZ}$) represents the net heating value of the combustion gas, which can be the flare gas 104 alone, the flare gas 104 mixed with the supplemental gas 122 (e.g., the vent gas 124), the flare gas 104 mixed with the assist gas(es) 126, or the flare gas 104 mixed with the supplemental gas 122 and the assist gas(es) 126. Thus, the second net heating value of the combustion gas in the combustion zone ($NHV_{CZ}$) is different from the first net heating value (NHV) of the flare gas 104. The emissions estimator 114 can employ at least a portion of the second set of process conditions, the environmental conditions, and the second net heating value in the combustion zone ($NHV_{CZ}$) to determine combustion efficiency according to the empirical model and/or the non-parametric machine learning model. The total emissions of the combustion gas can be further determined by the emissions estimator 114 from the calculated combustion efficiency.

Determination of the first net heating value (NHV) of the flare gas 104 is discussed below with further reference to FIG. 2. As shown, the emissions estimator 114 receives the first process conditions, including the speed of sound in the flare gas 104 within the conduit 102, the pressure of the flare gas 104 within the conduit 102, and the temperature of the flare gas 104 within the conduit 102. As discussed above, the speed of sound in the flare gas 104 can be received from the flow meter 132, the pressure of the flare gas 104 can be received from the pressure sensor 136a, and the temperature of the flare gas 104 can be received from the temperature sensor 136b.

In an embodiment, the flow meter 132 is an ultrasonic flow meter. Ultrasonic measurements can be employed to determine the speed of sound in the flare gas 104. The speed of sound in the flare gas 104, as well as the pressure and temperature of the flare gas 104, can be further employed to determine the molecular weight of the flare gas 104. A detailed discussion of determining the speed of sound in the flare gas and the molecular weight of the flare gas 104 can be found in U.S. Pat. No. 6,216,091, the entirety of which is incorporated by reference.

For hydrocarbons, including hydrogen ($H_2$), the net heating value (NHV) is strongly correlated to its molecular weight (MW). Using the speed of sound in the flare gas 104 and the corresponding MW of various hydrocarbon compounds in the flare gas 104, a linear fit or second order polynomial fit can be used to generate a satisfactory estimate of the first net heating value (NHV).

In alternative embodiments, the emissions estimator does not determine the first net heating value (NHV) based upon the first process conditions. Instead, the emissions estimator can determine the first net heating value (NHV) by retrieval from the data storage device or input from the user computing device.

In either case, the emissions estimator 114 can employ the first net heating value (NHV) to determine the combustion efficiency of the combustion gas. As further illustrated in FIG. 2, the emissions estimator 114 receives a second set of process conditions and one or more environmental conditions for determination of the second net heating value ($NHV_{CZ}$) of the combustion gas within the combustion zone 130. Examples of the second set of process conditions can include one or more of a flow rate of the flare gas 104, a flow rate of the vent gas (when the at least one supplemental gas(es) 122 are present), a flow rate of the at least one assist gas(es) 126 when present, a carbon/hydrogen ratio, or flare tip diameter. The flare tip diameter can be the inner diameter of the conduit 102 at about the flare tip 140 (e.g., the inner diameter of a terminal end of the conduit 102 adjacent the combustion zone 130.)

In an embodiment, when the combustion gas includes the flare gas 104, the at least one supplemental gas(es) 122, and the at least one assist gas(es) 126 (e.g., steam and/or air), the second net heating value of the combustion gas within the combustion zone ($NHV_{CZ}$) can be determined according to Equation 1:

$$NHV_{CZ} = \frac{Q_{vg} * NHV_{vg}}{Q_{vg} + Q_s + Q_a} \quad (1)$$

where $NHV_{cz}$ is in BTU/SCF, $NHV_{vg}$ is the net heating value of the vent gas (e.g., the flare gas 104 and the at least one supplemental gas(es) 122) in BTU/SCF, $Q_s$ is the volumetric flow rate of steam in SCFH, $Q_a$ is the volumetric flow rate of premix air in SCFH, and $Q_{vg}$ is the volumetric flow rate of vent gas 124 in SCFH. It can be appreciated from Equation 1 that, when steam or air is omitted from the assist gas(es) 126, the corresponding flow rate term, $Q_s$ or $Q_a$, respectively, is zero. Furthermore, when the assist gas(es) 126 is omitted from the combustion gas, the second net heating value of the combustion gas within the combustion zone ($NHV_{CZ}$) is equal to the net heating value of the vent gas ($NHV_{vg}$).

As discussed above, the volumetric flow rate of the flare gas 104 and/or vent gas 124 can be received from the flow meter 132, the volumetric flow rate of the supplemental gas 122 can be received from a fuel flow meter (if it is not measured by the flow meter 132), and the volumetric flow rate of the assist gas 126 can be received from a steam/air flow meter or the fan curve of an air blower (if it is not measured by the flow meter 132).

The emissions estimator 114 can be further configured to determine the combustion efficiency of the combustion gas based on the empirical model or the non-parametric machine learning model using at least a portion of the second process conditions and the one or more environmental conditions in combination with the second net heating value of the combustion gas within the combustion zone ($NHV_{cz}$). The environmental condition(s) can include a crosswind speed at or adjacent to a terminal end of the conduit 102 (e.g., the flare tip 140). Examples of empirical models can be configured to calculate the combustion efficiency (CE) as a function of $NHV_{cz}$, the vent gas exit velocity, the crosswind speed, and carbon to hydrogen ratio. Examples of non-parametric machine learning models can be configured to apply deep machine learning technology, such as a random forest algorithm, to calculate combustion efficiency (CE) using process conditions as well as environmental conditions.

The emissions estimator 114 can select which of the empirical model or the non-parametric machine learning model is employed to determine the combustion efficiency. In general, both models have certain strengths and limitations. Depending on the flare system configuration and process conditions, one can be chosen over the other. For example, under circumstances where process conditions such as the flare gas flow and/or flare gas composition do not change dramatically, the empirical model can provide more accurate results. Conversely, under circumstances, such as a flaring event, where the process conditions and/or environmental conditions change dramatically, the accuracy of the empirical model can be reduced. Because the second net heating value of the combustion gas in the combustion zone ($NHV_{CZ}$) is a function of the process conditions, it can be used to select between the two models. When the second net heating value ($NHV_{CZ}$) changes by less than a predetermined amount, on an absolute basis or percentage basis, during a defined time period, the empirical model can be selected. When the second net heating value ($NHV_{CZ}$) changes by greater than the predetermined amount, on an absolute basis or percentage basis, the non-parametric machine learning model can be selected.

Regardless of which model is selected, total emission (e.g., total uncombusted hydrocarbons, soot, methane ($CH_4$), carbon dioxide ($CO_2$), carbon dioxide equivalent ($CO_2e$), etc.) can be further determined from the volumetric flow rate of the vent gas and the estimated combustion efficiency. The exact manner in which total emission is calculated can be defined by regulations applicable to the facility at which the flaring process is performed.

Figure 3:
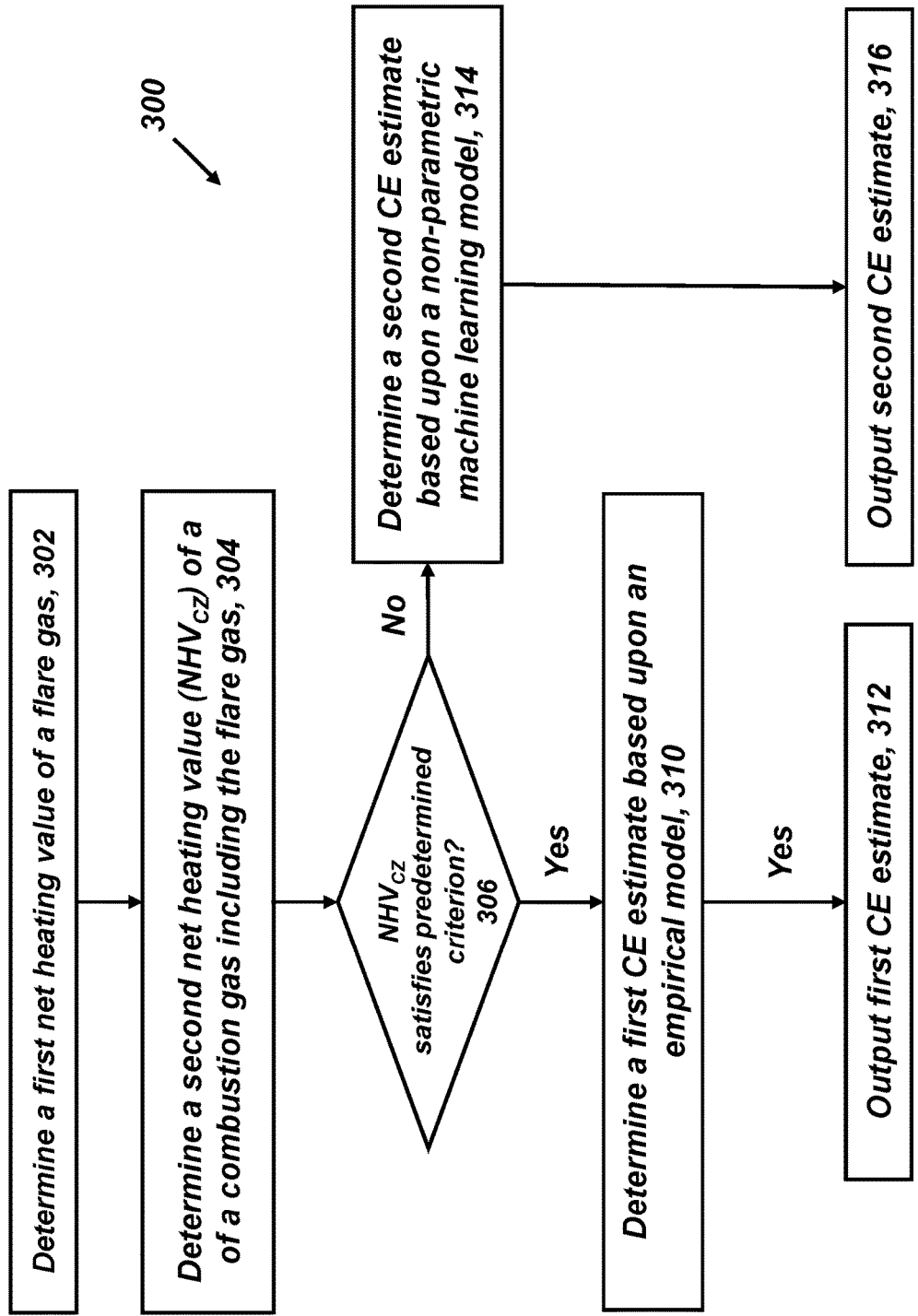
FIG. 3 is a flow diagram illustrating one exemplary embodiment of a method for monitoring emissions of a flaring process.

FIG. 3 is a flow diagram illustrating one exemplary embodiment of a method 300 for monitoring emissions of a flaring process, including determination of combustion efficiency and total emission. The method 300 is discussed below in the context of the above-discussed embodiments of FIGS. 1-2 and includes operations 302-316. It can be understood that, in alterative embodiments, the method can include greater or fewer operations than illustrated in FIG. 3 and the operations of the method can be performed in an order different than that illustrated in FIG. 3.

In operation 302, the first net heating value (NHV) of the flare gas 104 (e.g., the intrinsic flare gas NHV) can be determined by one or more processors (e.g., the emissions estimator 114). As discussed above, the emissions estimator 114 can determine the first net heating value (NHV) from the first process conditions, by input from the user computing device 116, or retrieval from the data storage device 120.

In operation 304, the second net heating value of the combustion gas within the combustion zone 130 ($NHV_{CZ}$) can be determined by the one or more processors (e.g., the emissions estimator 114). The combustion gas can include the flare gas 104 alone or in combination with one or more of the supplemental fuel gas(es) 122 or the assist gas(es) 126 (e.g., steam and/or air). The combustion zone 130 can be adjacent to a terminal end of the conduit 102 in which the combustion gas mixture flows. The second net heating value ($NHV_{CZ}$) can be determined based upon the first net heating value (NHV), and volumetric flow rates of the constituent gas(es) of the combustion gas (e.g., the volumetric flow rate of the assist gas(es) 122, a volumetric flow rate of a mixture of the flare gas 104 and assist gas(es) 126 prior to combustion, and a volumetric flow rate of the supplemental gas(es) 122, etc.)

In decision block 306, the one or more processors (e.g., the emissions estimator 114) can compare the second net heating value ($NHV_{CZ}$) to a predetermined criterion. As an example, the predetermined criterion can be a maximum change in the second net heating value ($NHV_{CZ}$) during a defined time period. This maximum change can be defined on an absolute (e.g., magnitude) basis or a percentage basis.

Under circumstances where the second net heating value ($NHV_{CZ}$) satisfies the predetermined criterion, the method 300 selects the empirical model and moves to operation 310, where the first combustion efficiency (CE) estimate is determined by the one or more processors (e.g., the emissions estimator 114). The determined first combustion efficiency (CE) can be further output by the emissions estimator 114 in operation 312.

Selection of the empirical model and output of the first combustion efficiency (CE) estimate reflects the understanding that, when the second net heating value ($NHV_{CZ}$) satisfies the predetermined criterion, the accuracy of the empirical model is relatively high.

Under circumstances where the second net heating value ($NHV_{CZ}$) does not satisfy the predetermined criterion, the method 300 selects the non-parametric machine model and moves to operation 314. In operation 314, the one or more processors (e.g., the emissions estimator 114) can determine the second estimate of combustion efficiency (CE) of the combustion gas. The machine learning model can also employ as inputs the second net heating value ($NHV_{CZ}$), an exit velocity of the vent gas 124 at a terminal end of the conduit 102, and the second process conditions and environmental conditions (e.g., crosswind speed at the terminal end of the conduit 102, flow rate of the assist gas(es) 126 and/or supplemental gas(es) 122 within the conduit 102, the ratio of carbon to hydrogen (for the flare gas, vent gas, or other gas combinations), the diameter of the flare tip 140.) The determined second combustion efficiency (CE) can be further output by the emissions analyzer in operation 316.

Selection of the machine learning model and output of the second combustion efficiency (CE) estimate reflects the understanding that, when the second net heating value ($NHV_{CZ}$) does not satisfy the predetermined criterion, the predictive accuracy of the empirical model is relatively low compared to that of the machine learning model. Accordingly, under these circumstances, use of the machine learning model to determine and output the second combustion efficiency (CE) estimate is justified despite its consumption of greater computational resources.

Figure 4:
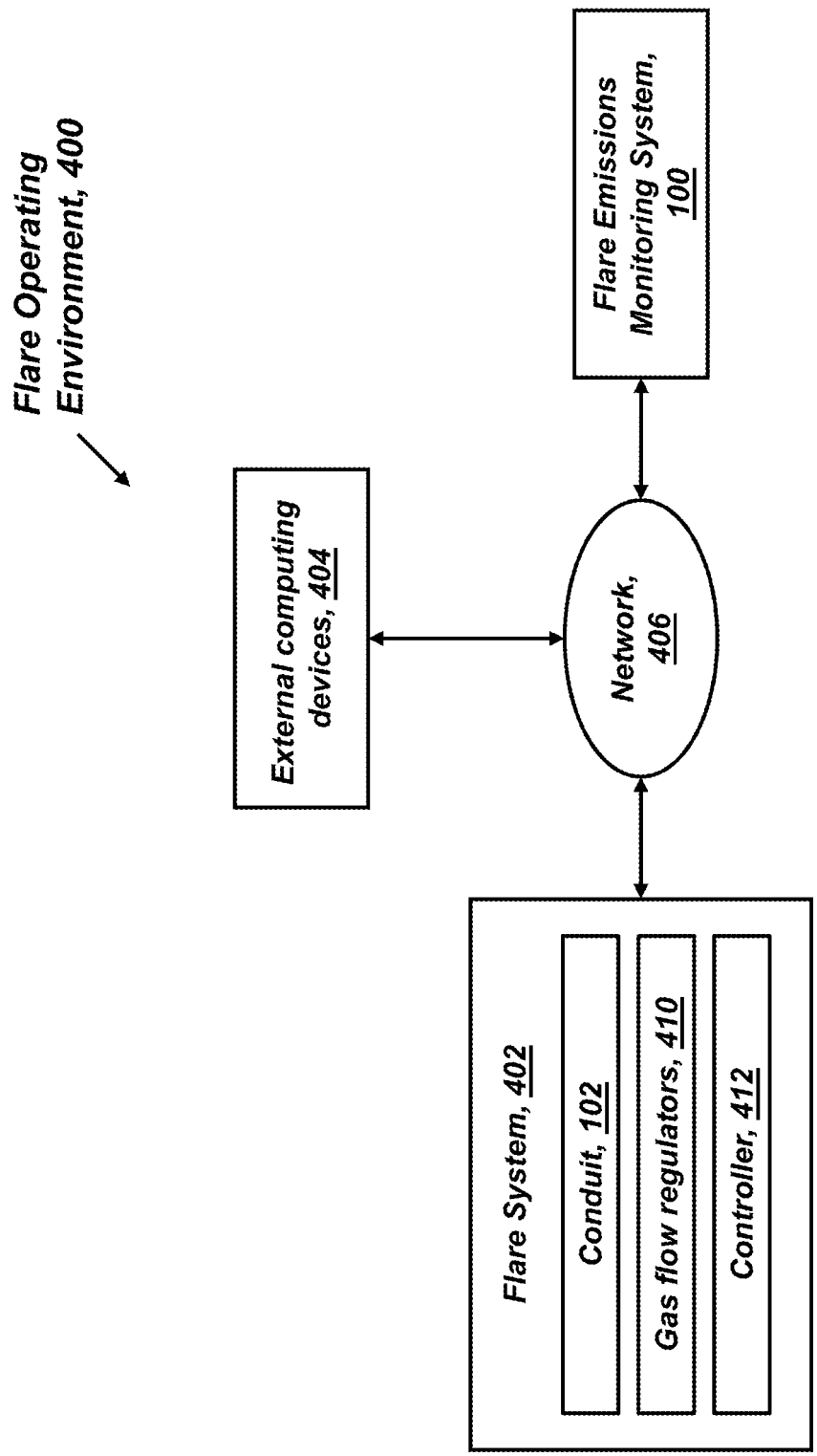
FIG. 4 is a block diagram illustrating an operating environment including the system of FIG. 1 in communication with a flare control system.

Embodiments of the flare emission monitoring system 100 can be further employed to improve flaring operations. FIG. 4 is a schematic block diagram illustrating one exemplary embodiment of a flare operating environment 400 including the flare emission monitoring system 100, a flare system 402, and one or more external computing devices 404 in communication via a network 406. As shown, the flare system 402 can include the conduit 102, respective gas flow regulators 410 for the flare gas 104, the supplemental gas(es) 122, the assist gas(es) 126, and a controller 412. The gas flow regulators 410 can be in communication with the controller 412 and configured to independently adjust the flow rates of the flare gas 104, the supplemental gas(es) 122, and the assist gas(es) 126 in response to commands received from the controller 412.

Figure 5:
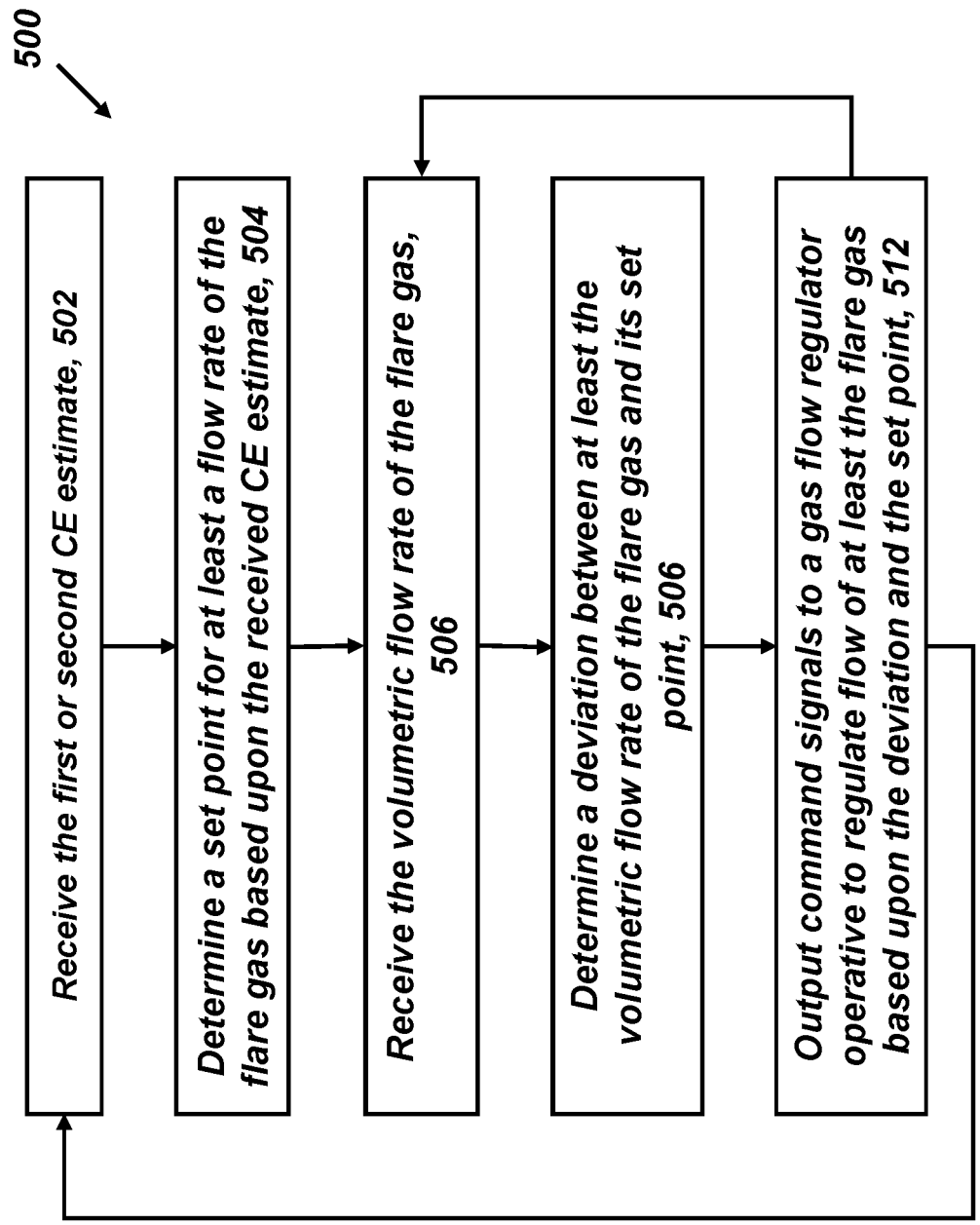
FIG. 5 is a flow diagram illustrating one exemplary embodiment of a method for flare control based upon estimated combustion efficiency.

FIG. 5 illustrates a method 500 for flare control performed by the flare system 402. The method 500 is discussed below in the context of the above-discussed embodiments of FIGS. 1-2 and includes operations 502-512. It can be understood that, in alterative embodiments, the method can include greater or fewer operations than illustrated in FIG. 5 and the operations of the method can be performed in an order different than that illustrated in FIG. 5.

In operation 502, the controller 412 can receive a CE estimate (e.g., the first CE estimate 312 or the second CE estimate 316). In one example, the controller 412 can receive the first CE estimate 312 or the second CE estimate 316 from the flare emissions monitoring system 100 via the network 406.

In operation 504, the controller 412 can determine a set point for flow of the flare gas 104 based upon the received CE estimate (e.g., the first CE estimate 312 or the second CE estimate 316). When the combustion gas includes the at least one supplementary gas(es) 122 (e.g., supplementary fuel gas(es)), the controller 412 can determine a set point for flow of the at least one supplementary gas(es) 122 and/or the vent gas 124 based upon the received CE estimate. When the combustion gas includes the at least one assist gas(es) 126 (e.g., air and/or steam), the controller 412 can determine a set point for flow of the at least one assist gas(es) 122 based upon the received CE estimate.

The controller 412 can be configured to determine the gas flow set points in a variety of ways. In one example, the controller 412 can employ a lookup table that correlates CE to respective flow rate set points (e.g., for the flare gas 104, and optionally for the at least one supplementary gas(es) 122, the at least one assist gas(es) 126 when present, or the vent gas 124). In another example, the controller 412 can employ predetermined algorithms that provide respective gas flow set points using CE as an input.

In operation 506, the controller 412 can receive the volumetric flow rate of the flare gas 104. When the combustion gas includes the at least one supplementary gas(es) 122 (e.g., supplementary fuel gas(es)), the controller 412 can receive the volumetric flow rate of the at least one supplementary gas(es) 122 and/or vent gas 124. When the combustion gas includes the at least one assist gas(es) 126 (e.g., air and/or steam), the controller 412 can receive the volumetric flow rate of the at least one assist gas(es) 126. In certain embodiments, at least a portion of the respective volumetric flow rates can be received directly from measurement devices (e.g., respective flow meters 132). In other embodiments, at least a portion of the respective volumetric flow rates can be received from a data storage device.

In operation 510, the controller 412 can determine a deviation between the volumetric flow rate of at least the flare gas 104 and the set point for the volumetric flow rate of the flare gas 104. When the combustion gas includes the at least one supplementary gas(es) 122 (e.g., supplementary fuel gas(es)), the controller 412 can determine the deviation between the volumetric flow rate of the at least one supplementary gas(es) 122 and/or vent gas 124 and the set point for the volumetric flow rate of at least one supplementary gas(es) 122 and/or vent gas 124. When the combustion gas includes the at least one assist gas(es) 126 (e.g., air and/or steam), the controller 412 can determine the deviation between the volumetric flow rate of the at least one assist gas(es) 126 and the set point for the volumetric flow rate of the at least one assist gas(es) 126.

In operation 512, the controller 412 can output one or more command signals to respective gas flow regulators based upon the set points and determined deviations in order to maintain/achieve the respective set points. In general, when the deviation for a respective volumetric gas flow rate is determined to be greater than a predetermined tolerance for that volumetric gas flow rate, the command signals can be operative to cause the corresponding gas flow regulator to actuate (e.g., open or close) in such a manner that reduces the determined deviation. In certain embodiments, such actuation can reduce the determined deviation to be less than the predetermined tolerance. Alternatively, when the deviation for a respective volumetric gas flow rate is determined to be less than its predetermined tolerance, the command signals can be operative to cause the corresponding gas flow regulators to maintain its state. Under circumstances where the deviation for a respective volumetric gas flow rate is determined to be less than its predetermined tolerance and the gas flow regulator does not require instructions to maintain its state, no command signals may be necessary.

The predetermined deviation can be received by the controller 412 in a variety of ways. In one example, the predetermined deviation can be retrieved from a data storage device (e.g., via the network 406. In another example, the predetermined deviation can be input by an operator. In either case, the predetermined deviation for respective volumetric flow rates can be independent of one another and can be the same or different.

Accordingly, the controller 412 can output one or more command signals to at least a flare gas flow regulator based upon the set point and determined deviation for the volumetric flow rate of at least the flare gas 104. When the combustion gas includes the at least one supplementary gas(es) 122 (e.g., supplementary fuel gas(es)), the controller 412 can output one or more command signals to at least one supplementary gas flow regulators based upon the set point and determined deviation for the volumetric flow rate of the at least one supplementary gas(es) 122 and/or the vent gas 124. When the combustion gas includes the at least one assist gas(es) (e.g., air and/or steam), the controller 412 can output one or more command signals to one or more assist gas flow regulators based upon the set point and determined deviation for the volumetric flow rate of the at least one assist gas(es) 126.

Following operation 512, under circumstances where the CE estimate does not change, the method 500 can return to operation 502. Alternatively, under circumstances where the CE estimate changes, the method 500 can return to operation 502 following operation 512. Beneficially, in this manner, closed-loop control of the gas flow rate for the flare gas 104, and optionally the at least one supplemental gas(es) 122, the vent gas 124, and/or the at least one assist gas(es) 126 when present, based upon CE estimates can be achieved.

In some embodiments, control of the flow rate of the flare gas can be omitted. As an example, under emergency circumstances where flaring is performed to relieve overpressure, the flow rate of the flare gas can be uncontrolled (e.g., as high as possible). Accordingly, under these circumstances, the flow rates of the at least one supplementary gas(es) and/or the flow rates of the at least one assist gas(es), when present, can be controlled as discussed above without control of the flow rate of the flare gas.

As discussed above, the flare emissions monitoring system 100 can be in communication with one or more external computing devices 404 via the network 406. The flare emissions monitoring system 100 can be configured to transmit operational data to the external computing device(s) 404. Examples of the operational data can include, but is not limited to, one or more of NHV calculated by the emissions estimator 114 (e.g., the intrinsic flare gas NHV, NHV in the combustion zone 130 ($NHV_{CZ}$), etc.), process conditions measured by the process condition sensors 106, environmental conditions measured by the environmental sensors 110 (e.g., crosswind speed), gas composition, etc. The external computing devices 404 can employ the operational data as training data for machine learning models configured to estimate CE. Beneficially, such training data can improve the accuracy of the machine learning models.

In additional embodiments, computational fluid dynamics modeling (CFD) of the flare tip can be performed to independently estimate flare CE under operating conditions. The CFD modeling can be performed by the emissions estimator 114, the external computing devices 404, or combinations thereof. The emissions estimator 114 can employ the CFD estimates of combustion efficiency for use in adjusting the selected model to output approximately the same combustion efficiency as the CFD estimate. This approach can improve the accuracy and reliability of the CE model.

Certain embodiments are discussed herein in the context of volumetric flow rate. However, alternative embodiments can employ other types of flow rates, such as mass flow rate, without limit.

Exemplary technical effects of the methods, systems, and devices described herein include, by way of non-limiting example estimation of combustion efficiency and total emissions of a flare gas. In one aspect, the model used to determine the combustion efficiency employs live (e.g., real-time) data and can be changed as process conditions and/or environmental conditions change. As a result, the determined combustion efficiency and total emissions estimates can exhibit greater accuracy, as compared to corresponding estimates based upon models that employ static process conditions and/or environmental conditions as inputs. In another aspect, the process conditions and environmental conditions used as inputs to the selected model can be measured using commonly deployed online sensors, avoiding the need for costly upgrades to existing flare equipment.

Certain exemplary embodiments have been described to provide an overall understanding of the principles of the structure, function, manufacture, and use of the systems, devices, and methods disclosed herein. One or more examples of these embodiments have been illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

The subject matter described herein can be implemented in analog electronic circuitry, digital electronic circuitry, and/or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. "Approximately," "substantially, or "about" can include numbers that fall within a range of 1%, or in some embodiments within a range of 5% of a number, or in some embodiments within a range of 10% of a number in either direction (greater than or less than the number) unless otherwise stated or otherwise evident from the context (except where such number would impermissibly exceed 100% of a possible value). Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

One skilled in the art will appreciate further features and advantages of the invention based on the above-described embodiments. Accordingly, the present application is not to be limited by what has been particularly shown and described, except as indicated by the appended claims. All publications and references cited herein are expressly incorporated by reference in their entirety.

The invention claimed is:

1. A method of monitoring emissions, comprising:
determining, in real-time, by one or more processors, a first net heating value (NHV) of a flare gas emitted from an industrial process;

determining, in real-time, by the one or more processors, a second net heating value ($NHV_{CZ}$) of a combustion gas within a combustion zone including at least the flare gas, wherein the second net heating value ($NHV_{CZ}$) is determined based upon the first net heating value (NHV) and a first volumetric flow rate of the flare gas;

comparing, in real-time, by the one or more processors, the second net heating value ($NHV_{CZ}$) to a predetermined criterion;

generating, in real-time, by an empirical model selected from a plurality of computational models a first estimate of combustion efficiency of the combustion gas when the second net heating value ($NHV_{CZ}$) is determined to satisfy the predetermined criterion;

generating, in real-time, by a non-parametric machine learning model selected from the plurality of computational models a second estimate of combustion efficiency of the combustion mixture when the second net heating value ($NHV_{CZ}$) does not satisfy the predetermined criterion;

determining, in real-time, by the one or more processors, a total emissions of the combustion gas based on the first or second combustion efficiency estimate; and outputting, in real-time, by the one or more processors, the first or second combustion efficiency estimate corresponding to the selected model and the total emissions to a display communicatively coupled to the one or more processors to be viewed by a user.

2. The method of claim 1, further comprising determining, in real-time, by the one or more processors, total emissions of the combustion gas based upon the output one of the first combustion efficiency estimate or the second combustion efficiency estimate.

3. The method of claim 1, wherein determining, in real-time, the first net heating value (NHV) comprises receiving the first net heating value from a data storage device.

4. The method of claim 1, wherein determining, in real-time, the first net heating value (NHV) comprises:
measuring, prior to combustion, a speed of sound in the flare gas, a pressure of the flare gas, and a temperature of the flare gas; and
determining, in real-time, by the one or more processors, a molecular weight of the flare gas based upon the measured speed of sound in the flare gas, the pressure of the flare gas, and the temperature of the flare gas.

5. The method of claim 4, wherein the speed of sound in the flare gas is measured by an ultrasonic flow meter.

6. The method of claim 1, further comprising:
measuring, in real-time, by a multi-spectral imaging system, absorption/emission spectra of the combustion gas; and
determining, in real-time, by the one or more processors, a third estimate of the combustion efficiency of the combustion gas based upon the measured spectra.

7. The method of claim 6, further comprising adjusting, in real-time, the selected model such that the output combustion efficiency estimate is approximately equal to the third estimate of combustion efficiency.

8. The method of claim 1, wherein the combustion gas further comprises a supplementary fuel gas and wherein the second net heating value ($NHV_{CZ}$) is further determined, in real-time, based upon a second volumetric flow rate of the supplementary fuel gas.

9. The method of claim 1, wherein the combustion gas further comprises at least one assist gas and wherein the second net heating value ($NHV_{CZ}$) is further determined, in real-time, based upon a third volumetric flow rate of the assist gas.

10. The method of claim 1, wherein the combustion gas further comprises a supplementary fuel gas and at least one assist gas and wherein the second net heating value ($NHV_{CZ}$) is further determined, in real-time, based upon a second volumetric flow rate of the supplementary fuel gas and a third volumetric flow rate of the at least one assist gas.

11. The method of claim 1, wherein the conduit is a portion of a flare stack.

12. A system for monitoring emissions, comprising:
one or more processors configured to:
determine, in real-time, a first net heating value (NHV) of a flare gas emitted from an industrial process;
determine, in real-time, a second net heating value ($NHV_{CZ}$) of a combustion gas within a combustion zone including the flare gas, wherein the second net heating value ($NHV_{CZ}$) is determined based upon the first net heating value (NHV) and a first volumetric flow rate of the flare gas;
compare, in real-time, the second net heating value ($NHV_{CZ}$) to a predetermined criterion;
generate, in real-time, by an empirical model selected from a plurality of computational models, a first estimate of combustion efficiency of the combustion gas when the second net heating value ($NHV_{CZ}$) satisfies the predetermined criterion;
generate, in real-time, by a non-parametric machine learning model selected from a plurality of computational models, a second estimate of combustion efficiency of the combustion gas when the second net heating value ($NHV_{CZ}$) does not satisfy the predetermined criterion; and
output, in real-time, the selected one of the first combustion efficiency estimate or second combustion efficiency estimate corresponding to the selected model to a display communicatively coupled to the one or more processors to be viewed by a user,
provide, to a controller communicatively coupled to the one or more processors, a command signal configured to regulate the first volumetric flow rate of the flare gas based on the first or the second combustion efficiency estimate.

13. The system of claim 12, wherein the one or more processors is further configured to determine, in real-time, total emissions of the combustion gas based upon the output one of the first combustion efficiency estimate or the second combustion efficiency estimate.

14. The system of claim 12, further comprising a data storage device in communication with the one or more processors, wherein the one or more processors is further configured to determine, in real-time, the first net heating value (NHV) by receipt of the first net heating value from the data storage device.

15. The system of claim 12, wherein the one or more processors is further configured to:
receive a speed of sound in the flare gas prior to combustion, a pressure of the flare gas prior to combustion, and a temperature of the flare gas prior to combustion; and
determine, in real-time, a molecular weight of the flare gas based upon the measured speed of sound in the flare gas, the pressure of the flare gas, and the temperature of the flare gas.

16. The system of claim 15, further comprising:
a flow meter configured to measure the speed of sound in the flare gas and the flow rate of the flare gas prior to combustion;
a temperature sensor configured to measure the temperature of the flare gas;
a pressure sensor configured to measure the pressure of the flare gas.

17. The system of claim 15, wherein the flow meter is an ultrasonic flow meter.

18. The system of claim 12, further comprising a multi-spectral imaging system configured to measure spectra of the combustion gas, wherein the one or more processors is further configured to determine, in real-time, a third estimate of the combustion efficiency of the combustion gas based upon the measured spectra.

19. The system of claim 18, wherein the one or more processors is further configured to adjust, in real-time, the selected model such that the output combustion efficiency estimate is approximately equal to the third estimate of combustion efficiency.

20. The system of claim 12, wherein the combustion mixture further comprises a supplementary fuel gas and wherein the second net heating value ($NHV_{CZ}$) is further determined, in real-time, based upon a second volumetric flow rate of the supplementary fuel gas.

21. The system of claim 12, wherein the combustion gas further comprises at least one assist gas and wherein the second net heating value ($NHV_{CZ}$) is further determined, in real-time, based upon a third volumetric flow rate of the assist gas.

22. The system of claim 12, wherein the combustion gas further comprises a supplementary fuel gas and at least one assist gas and wherein the second net heating value ($NHV_{CZ}$) is further determined, in real-time, based upon a second volumetric flow rate of the supplementary fuel gas and a third volumetric flow rate of the at least one assist gas.

23. The system of claim 12, wherein the conduit is a portion of a flare stack.

24. A method for flare control, comprising:
receiving, by one or more processors, a real-time combustion efficiency (CE) estimate determined for a combustion gas flared within a combustion zone in a flaring operation, wherein the combustion gas includes at least a flare gas emitted from an industrial process;
determining, in real-time, by the one or more processors, a first set point for flow of the flare gas based upon the received real-time CE estimate;
determining, in real-time, by the one or more processors, a first volumetric flow rate of the flare gas;
determining, in real-time, by the one or more processors, a first deviation between the first volumetric flow rate and the first set point; and
providing, in real-time, by the one or more processors, one or more first command signals to a controller communicatively coupled to the one or more processors when the determined first deviation is greater than a predetermined first tolerance, wherein the one or more first command signals are operative to cause a flow regulator to actuate in a manner that reduces the determined first deviation.

25. The method of claim 24, wherein the received CE estimate is determined, in real-time, by an empirical model.

26. The method of claim 24, wherein the received CE estimate is determined, in real-time, by a non-parametric machine learning model.

27. The method of claim 24, wherein the combustion gas further comprises at least one supplementary fuel gas and wherein the one or more processors are further configured to:
determine, in real-time, a second set point for flow of the at least one supplementary fuel gas, or a vent gas including the flare gas and the supplementary fuel gas, based upon the received CE estimate;
determine, in real-time, a second volumetric flow rate of the at least one supplementary fuel gas or the vent gas;
determine, in real-time, a second deviation between the second volumetric flow rate and the second set point; and
provide, in real-time, by the one or more processors, one or more second command signals to the controller when the determined second deviation is greater than a second predetermined tolerance, wherein the one or more second command signals are operative to cause the flow regulator to actuate in a manner that reduces the determined second deviation.

28. The method of claim 24, wherein the combustion gas further comprises at least one assist gas and wherein the one or more processors are further configured to:
determine, in real-time, a third set point for flow of the at least one assist gas based upon the received CE estimate;
determine, in real-time, a third volumetric flow rate of the at least one at least one assist gas;
determine, in real-time, a third deviation between the third volumetric flow rate and the third set point; and
provide, in real-time, by the one or more processors, one or more third command signals to the controller when the determined third deviation is greater than a third predetermined tolerance, wherein the one or more third command signals are operative to cause the flow regulator to actuate in a manner that reduces the determined third deviation.

* * * * *